March 13, 1962 W. E. STEEN 3,024,665
VARIABLE RATIO TRANSMISSION
Filed Feb. 15, 1960 3 Sheets-Sheet 1

INVENTOR.
WILLIAM E. STEEN
BY
Andrus + Starke
Attorneys

March 13, 1962 W. E. STEEN 3,024,665
VARIABLE RATIO TRANSMISSION
Filed Feb. 15, 1960 3 Sheets-Sheet 2
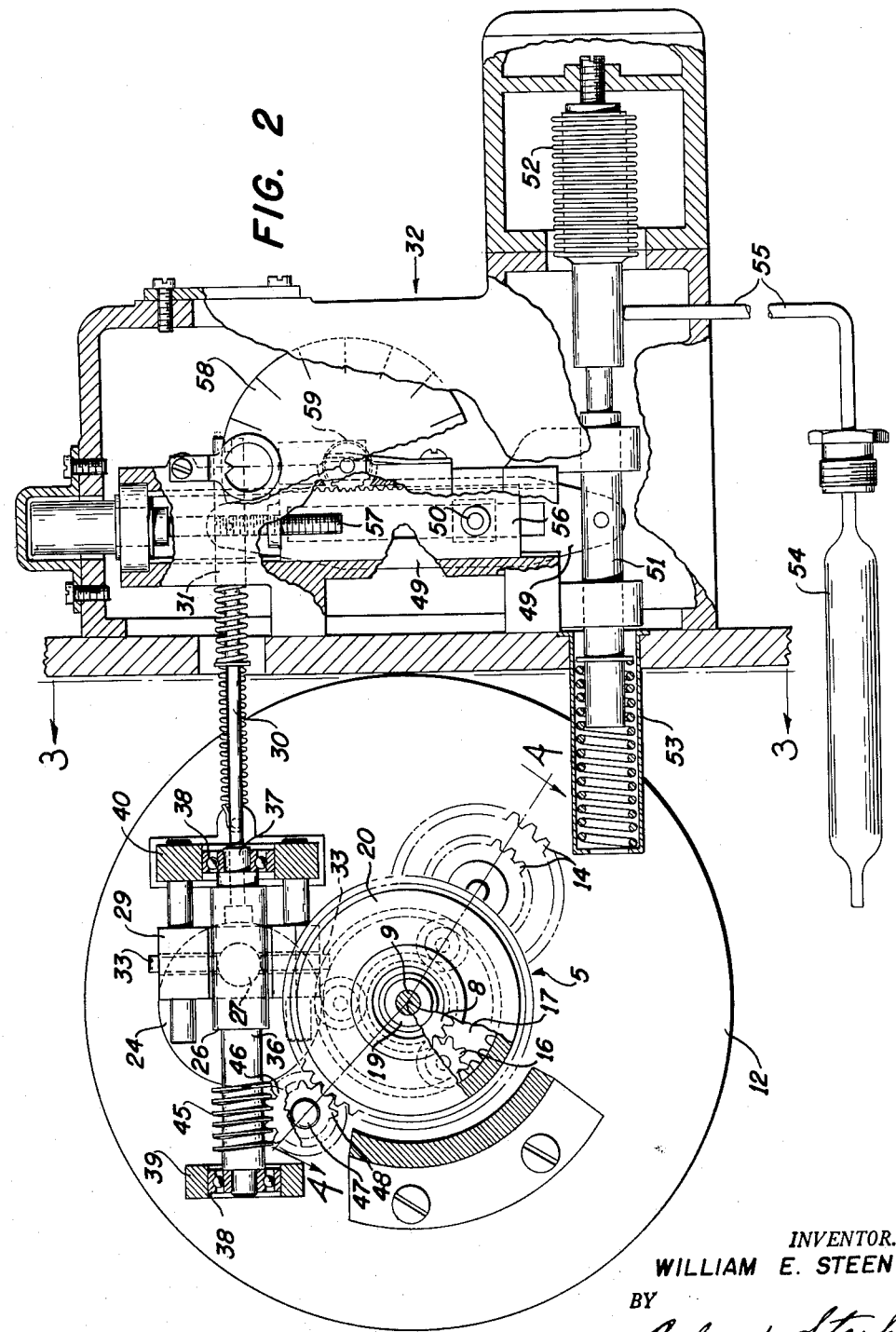
INVENTOR.
WILLIAM E. STEEN
BY
Andrus + Starke
Attorneys March 13, 1962 W. E. STEEN 3,024,665
VARIABLE RATIO TRANSMISSION
Filed Feb. 15, 1960 3 Sheets-Sheet 3

INVENTOR.
WILLIAM E. STEEN
BY
Andrus + Starke
Attorneys

United States Patent Office 3,024,665
Patented Mar. 13, 1962

3,024,665
VARIABLE RATIO TRANSMISSION
William E. Steen, South Pasadena, Calif., assignor to A. O. Smith Corporation, Milwaukee, Wis., a corporation of New York
Filed Feb. 15, 1960, Ser. No. 8,570
8 Claims. (Cl. 74—198)

This invention relates to a variable ratio transmission of the ball integrating variety and particularly to high efficiency and accurate transmission of the drive.

A variable transmission is employed to establish a varying or an adjustable output for any given input. Thus, a variable transmission is normally employed to connect a recording unit to a meter for establishing a record of liquid flow in petroleum product pipe lines. The meter is usually of the volumetric variety which establishes a rotating output in accordance with the actual volume of liquid through the meter.

The volume of the liquid varies with the temperature of the liquid due to the expansion and contraction of a liquid with temperature. Further, the amount of expansion and contraction for any given temperature change is different for many liquids which are carried by the pipe line and thus through the meter. Generally the amount of volumetric change with temperature is directly related to the specific gravity of the material.

Correction means are preferably inserted between the mechanical output of the meter and the recording device to change the ratio of the meter input to output with the temperature and the specific gravity of the material flowing through the meter in order to establish a universal recording system.

In the United States Patent No. 2,791,118, a differential gear system is connected between the meter and the recording means. The differential gear system includes a first rotational input corresponding directly to the output of the meter and a second rotational input which includes a ball integrator establishing a variable ratio drive between the output of the meter and the differential gear system. As shown therein, a ball integrator includes a carriage secured to a lever to position a pair of transmission balls between a driving input speed disc and a driven output speed roller. The disc is driven by the meter and transmits the meter motion through the balls to the driven roller. The radial position of the balls on the disc determines the rotational speed of the roller for any given rotational speed of the disc. The ball carriage is continuously positioned in accordance with the temperature of the liquid being metered.

The sensitivity and reliability of the ball integrator transmission over relatively long periods of time have included certain inaccuracies. The output torque of the driven roller varies with the radial position of the balls and the ball wear changes the efficiency of the transmission. Further, the thrust forces established on the balls by the rotating disc create friction losses which reduce the efficiency of the speed transmission. Such compensators are then only partially effective in relating the volumetric flow to a base temperature and to the coefficient of expansion.

The present invention is directed to an improvement in a ball integrating transmission to establish an accurate and reliable recording of liquid flow for long periods of operation. The transmission balls are rotatably mounted within a carriage between a driven disc and a driving roller. The carriage is coupled to a positioning control such as the pivotal lever control shown in the previously referred to U.S. Patent No. 2,791,118 or applicant's copending application entitled "Temperature and Coefficient Expansion Compensators for Liquid Slow Recorders," filed on February 15, 1960, Serial No. 8,813 and assigned to a common assignee.

In accordance with the present invention, one end of the roller driven by the transmission balls is fixed within a suitable supporting ball bearing or the like. The opposite end is resiliently mounted and continuously biased towards the rotating disc to positively load the ball bearings. The slight play in a standard ball bearing or the like supporting the stationary end of the roller permits imperceptible angular movement of the roller with the balls as a fulcrum point incident the movement of the transmission balls between the center and the outer periphery of the disc or incident the slight wear which might result from long usage of the apparatus.

The transmission balls constitute the fulcrum about which the roller pivots and consequently as the balls move between the center and the periphery of the disc the fulcrum point changes. The change in the fulcrum point produces a greater load on the balls as they move towards the center of the disc and results in a more uniform drive torque under varying ratio conditions. The resilient loading of the roller thus offers a very simple design for obtaining uniform drive torque throughout the operating range of the apparatus.

In accordance with another aspect of the present invention, a pair of large guide rollers are mounted in the carriage on opposite sides of the transmission balls and rotatably carried by relatively small hardened pins or shafts to absorb the thrust forces established on the transmission balls by the rotating disc. The large diameter rollers are of sufficient size to simultaneously contact both of the balls and absorb the complete thrust forces from the transmission balls. The large guide rollers introduce a very minimum of friction into the system and very high efficiency of operation is maintained. The large diameter rollers also permit the use of pins or shafts of ample size to provide good wear characteristics while maintaining the minimum friction in the free-rolling contact.

The variable ball integrating transmission of the present invention is a high efficiency drive maintaining accurate and reliable drive ratios for long periods of use.

The drawings furnished herewith illustrate the best mode presently contemplated for carrying out the invention.

In the drawings:

FIG. 2 is an enlarged top view of the compensator connected between the meter and the recorder with parts broken away to show inner details of construction;

Figure 1:
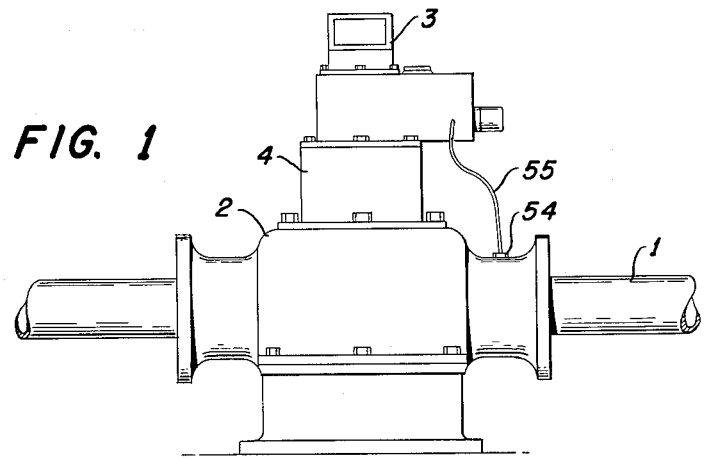
FIG. 1 is an elevational view of a liquid flow meter adapted to drive a recorder through a compensator constructed in accordance with the present invention.

Referring to the drawings and particularly to FIG. 1, a liquid transfer line 1 is illustrated and which is adapted to carry liquids of different specific gravities. A meter 2 is connected in series in the line 1 and is adapted to establish a rotational output in proportion to the volume of the liquid passing through the meter. A recorder or other registering apparatus 3 is mounted on top of the meter 2 and connected through an adjustable ratio drive 4 to the output of the meter 2. The adjustable ratio drive 4 is adapted to automatically establish temperature compensation and includes a manual adjustment means for changing the ratio of the drive in accordance with the specific gravity of the fluid flowing through the meter 2.

The meter 2 is any standard volumetric responsive meter adapted to establish a rotational output in accordance with the volumetric flow through the meter, for example, as shown in U.S. Patent 2,362,778 to W. E. Steen and no further specific description or illustration is given. Similarly, the recorder 3 is of any standard construction and no further description is given.

Figure 3:
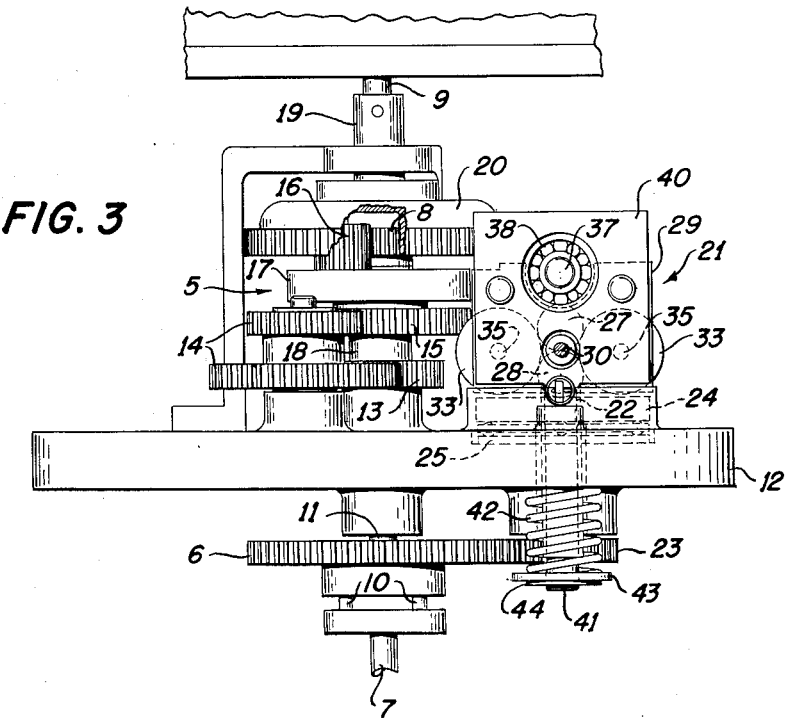
FIG. 3 is a side elevational view taken on the line 3—3 of FIG. 2.

The adjustable ratio drive 4 includes a planetary or differential transmission 5, shown in FIGS. 2 and 3, which is automatically adjusted to compensate for temperature changes of the liquid in line 1.

Figure 4:
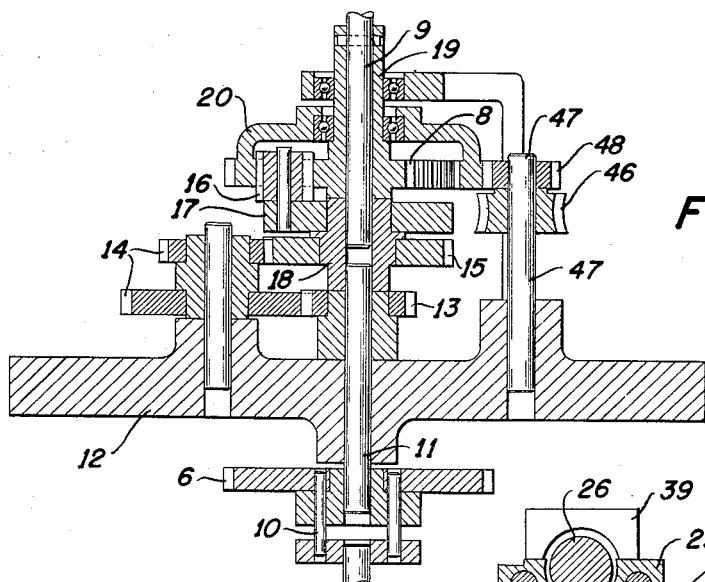
FIG. 4 is a sectional view of the differential gear system taken on line 4—4 of FIG. 2.

Referring particularly to FIGS. 2-4, an input gear 6 to the ratio drive 4 is connected to an output shaft 7 from meter 2 and an output gear 8 from the ratio drive is connected to an input shaft 9 to the recorder 3. A conventional pin and slot coupling 10 connects the meter shaft 7 to the gear 6 which drives the planetary transmission 5 as follows.

Gear 6 is pinned or otherwise rigidly connected to an input shaft 11 which is journaled within a supporting wall 12 of the ratio drive 4. A gear 13 is secured to the shaft 11 and through a gear train 14 drives a gear 15 which is mounted for free rotation about the shaft 11.

Three planetary gears 16, of which only two are shown, of the planetary transmission 5 are equicircumferentially carried by a common yoke 17 which is mounted upon a hub 18 in common with gear 15. Output gear 8 constitutes a sun gear which is secured to the output shaft 9 by an elongated hub 19 and is located in constant engagement with the three planetary gears 16. A ring gear 20 is journaled upon hub 19 and encircles gears 16 to variably drive the planetary gears 16.

The ring gear 20 is adjustably driven in accordance with changes in the temperature and specific gravity of the fluid being metered as subsequently described. The yoke 17 and planetary gears 16 are driven directly in accordance with the volumetric flow through meter 2. The sun gear 8 is thus simultaneously driven by gears 16 and 20 and the output speed of the sun gear 8, and the attached shaft 9, is equal to the difference in the rotational speed of the ring gear 20 and the three planetary gears 16.

The driven gear 6 drives the planetary gears 16 and also constitutes an input drive to a ball integrator 21 having an output which is adapted to drive the ring gear 20. The ball integrator 21 diverts a portion of the drive and after suitable correction in accordance with the temperature and the specific gravity of the liquid flowing in line 1 feeds the drive back into the planetary transmission 5 through gear 20 to establish a net output which accurately records the volumetric flow of the liquid to a base temperature.

Figure 5:
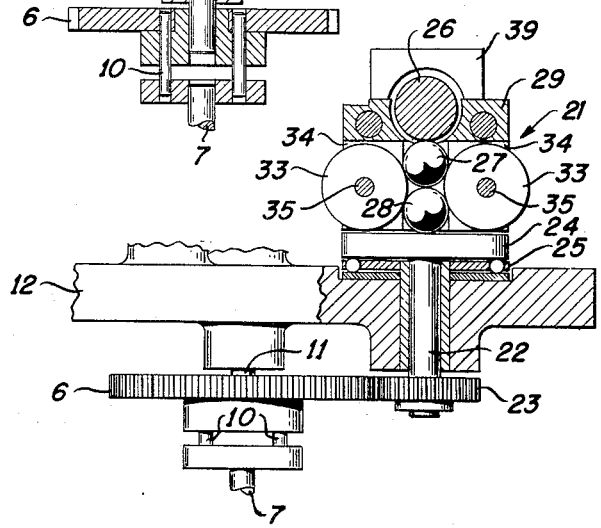
FIG. 5 is a fragmentary view of a ball integrator constructed in accordance with the present invention.

Referring particularly to FIGS. 2, 3 and 5, the ball integrator 21 includes an input shaft 22 which is journaled for rotation within a suitable bearing in the supporting wall 12. A gear 23 is secured to shaft 22 and meshes with the driven gear 6 carried by the shaft 11 for rotation in accordance with the meter driven output shaft 7. A driven disc 24 is secured to the opposite end of the shaft 22 and rests upon a thrust bearing unit 25 disposed between the back side of disc 24 and wall 12. An output driving roller 26 is rotatably mounted in spaced relation to the driven disc 24 with the axis of the roller extending perpendicular and coplanar to the axis of the disc. A pair of transmission balls 27 and 28 are maintained in stacked relation between the disc 24 and the driving roller 26 by a movable ball cage 29. The center of the balls 27 and 28 are in the common plane with the axis of the roller 26 and the driven disc 24 and transmit the rotation of the driven disc 24 to the output driving roller 26. For any given pressure, the output speed of the roller 26 is dependent upon the radial positioning of the transmission balls 27 and 28.

The ball cage 29 is generally a rectangular member having an opening generally corresponding to the diameter of the balls 27 and 28. An integral rod 30 projects from the cage 29 parallel to the axis and in the opposite direction of the roller 26 and terminates in an adjustably threaded coupling unit 31. A temperature compensating assembly 32 is connected to coupling unit 31 to position rod 30 and thus the balls 27 and 28 relative to the disc 24 to vary the ratio between the speed of the driven input disc 24 and the output roller 26 incident changes in the temperature in the fluid being metered. As most clearly shown in FIGS. 2 and 6, the roller 26 is of sufficient length to allow complete movement of the balls 27 and 28 with respect to disc 24 without loss of drive engagement.

The rotational force of the disc 24 establishes circumferential thrust forces in the direction of the disc rotation on the balls 27 and 28 within the ball cage 29. The thrust forces must be absorbed with a minimum of friction to maintain efficiency and accuracy in the transmission.

Figure 6:
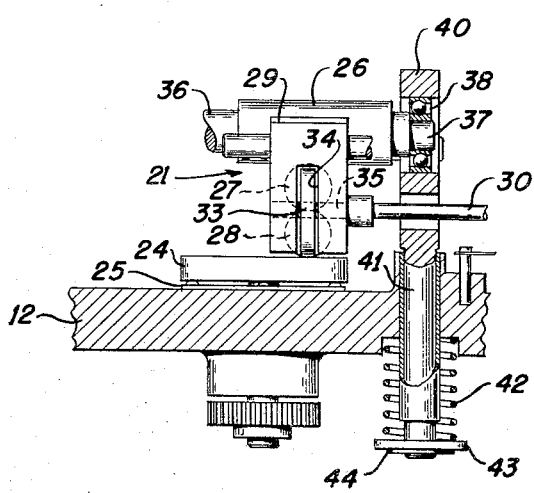
FIG. 6 is a fragmentary view illustrating a resilient mounting of the driven roller of the ball integrator.

In accordance with the present invention, a pair of large guide rollers 33 are rotatably mounted on opposite sides of balls 27 and 28 within suitable slots 34 in the cage 29, as most clearly shown in FIGS. 5 and 6. The guide rollers 33 are mounted on small hardened pins 35 which are secured within the cage assembly generally in the plane between the balls 27 and 28. The guide rollers 33 are of a sufficient diameter to establish simultaneous contact with the balls 27 and 28 to take up all thrust forces.

The relatively large rollers 33 mounted on small hardened pins 35 introduce very minimum friction while the pins themselves are of ample size to establish good wear characteristics. This maintains an efficient and accurate speed transmission.

In accordance with another aspect of the present invention, the driving roller 26 is resiliently biased towards the balls 27 and 28 to maintain a predetermined loading of the balls. Referring particularly to FIGS. 2, 3 and 6, a relatively long extension 36 and a relatively short shaft extension 37 project axially from opposite ends of the roller 26. The shaft extensions 36 and 37 are mounted by suitable ball bearings 38 in walls 39 and 40, respectively, which extend perpendicularly from the supporting wall 12.

The wall 39 includes an opening adapted to rigidly receive the ball bearing 38 adjacent shaft extension 36 to rotatably support the roller 26 while holding the adjacent end of the shaft extension 36 against appreciable radial movement.

Wall 40 is similarly apertured to receive bearing 38 for shaft extension 37 and is resiliently mounted upon the supporting wall 12 by an integral shaft 41 which projects through a bearing opening in wall 12. A coil spring 42 encircles the terminal end of shaft 41 and is compressed between the wall 12 and a clamping washer 43 secured to the terminal end of the shaft. A snap ring 44 secures washer 43 to the shaft 41. The spring 42 tends to expand and draw the wall 40 toward the wall 12. A force is thus applied to the roller 26 and establishes a firm and positive loading of the balls 27 and 28.

The bearing 38 in wall 39 includes ample play to allow the very slight pivoting of the roller 26 incident radial movement of the balls across the disc 24. Slight pivoting will also occur because of component wear after long usage of the assembly.

As the transmission balls 27 and 28 are positioned upon disc 24, the fulcrum point changes and the length of the roller 26 between the transmission balls 27 and 28 and the resiliently mounted stub end 37 of roller 26 increases. This has the effect of producing a greater load on the transmission balls 27 and 28 as they move toward the center of the disc 24 and establishes a more uniform drive torque for all positions of the transmission balls.

The roller 26 is therefore driven at a varying speed but with a constant torque.

In summary, the disc 24 of the ball integrator 21 is driven in direct proportion to the speed of the output meter shaft 7. The rotation of the disc 24 is adjustably transmitted to the roller 26 through the balls 27 and 28 by selective positioning of the balls. The resilient wall 40 continuously holds the roller 26 in pressure engagement with the transmission balls 27 and 28 to maintain a uniform torque output. The guide rolls 33 maintain a free-rolling contact which absorbs the thrust forces established on the balls 27 and 28 due to the rotation of the disc 24 to maintain the location of the balls with a minimum of friction. Consequently, the roller 26 is driven at a speed which is proportional to the speed of the meter shaft 7 with the ratio being determined by the setting of the transmission balls 27 and 28 with respect to the disc 24.

Referring particularly to FIGS. 2, 4 and 6, the shaft extension 36 carries an integrally formed worm 45. A worm gear 46 is rotatably mounted by a shaft 47 in constant mesh with worm 45. A coupling gear 48 is also coupled to worm gear 46 and meshes with the ring gear 20 to drive the ring gear in accordance with the speed of the driven roller 26.

Thus the planetary transmission 5 is simultaneously driven in direct proportion to the output of the meter 2 through the planetary gears 16 and in accordance with a variable proportion to the output of the meter 2 through the ring gear 20. The output gear 8 which is driven by gears 16 and 20 is driven in accordance with the volumetric flow through meter 2 with adjustment in accordance with the position of transmission balls 27 and 28.

As previously noted, the ball cage 29 is coupled by the coupling unit 31 to a temperature compensating assembly 32 to continuously position the balls 27 and 28 in accordance with the temperature of the liquid flowing through the meter 2.

The temperature compensating assembly 32 is similar to that described and claimed in applicant's copending application entitled, "Temperature and Coefficient Expansion Compensators for Liquid Flow Recorders," filed on even date herewith and assigned to a common assignee. Assembly 32 is therefore only described to the extent necessary to understand the operation of the illustrated embodiment of the invention.

Generally, the illustrated assembly 32 includes a pivoted lever 49 which is intermediately pivoted upon a pivot shaft 50. One end of lever 49 is coupled or tied to the cage rod 30 and the opposite end is tied to a spring-loaded rod 51. An expansible bellows 52 is secured to one end of rod 51 and a coil spring 53 is secured to the opposite end of rod 51. A temperature sensing bulb 54 is mounted within the pipe line 1 and contains a fluid having a high coefficient of expansion. A capillary tube 55 connects the bulb 54 in communication with the bellows 52 such that changes in the volume of the fluid in the bulb 54 causes corresponding expansion and contraction of the bellows 52.

Changes in the temperature of the liquid in the line 1 results in a corresponding temperature change in the fluid within the bulb 54. The fluid in bulb 54 expands and contracts with the temperature changes and causes the bellows 52 to expand and contract. The movement of the bellows 52 is transmitted to rod 51 which pivots the lever 49 to position the cage rod 30 and integral cage 29 between the driving disc and the driven roller. The movement of the transmission balls 27 and 28 adjusts the drive ratio between the meter 2 and the recorder 3 to compensate for the changes in the temperature of the liquid flowing through meter 2.

As more fully described in the previously referred to copending application, the pivot shaft 50 is movably supported by a carriage 56. A manually actuated control shaft 57 is secured to position the carriage and attached pivot shaft 50 to adjust the ratio of movement of opposite ends of lever 49 for any given movement of the positioning rod 51.

A dial 58 is coupled to the carriage 56 by rack and pinion 59 to establish a visual indication of the position of carriage 56. Dial 58 is graduated in units of specific gravity or the like to permit rapid adjustment of the unit in accordance with the specific gravity of the liquid in line 1.

The operation of the illustrated embodiment of the invention is summarized as follows.

The bulb 54 is mounted in line 1 and actuates the bellows 52 to position rod 51 in accordance with the temperature of the liquid in line 1. The lever 49 of assembly 32 is correspondingly angularly positioned to position the ball cage 29. The transmission balls 27 and 28 are thus radially positioned to establish a proportional drive between the disc 24 and roller 26 which is inserted into the planetary transmission 5. The drive inserted from the integrator 21 adjusts the output ratio between the meter driven shaft 7 and the output shaft 9 to compensate for temperature changes and establishes the reading of recorder 3 to a base temperature.

The ball integrating drive of the present invention maintains a constant output torque for all positions of the transmission balls. The slight pivotal action of the driven roller under the resilient load maintains a constant pressure load upon the balls and thus compensates for wear and the like. The friction rollers absorb the thrust forces on the transmission balls to maintain highly efficient transfer of the drive between the disc and the roller.

The present invention thus provides a high efficiency and long life ball integrating transmission which is readily adapted to practical construction and operation.

Various modes of carrying out the invention are contemplated as within the scope of the following claims particularly pointing out and distinctly claiming the subject matter which is regarded as the invention.

I claim:

1. A ball integrating transmission having a plurality of stacked transmission balls coupling a force transmitting roller and a disc, which comprises a ball cage adapted to contain said balls in stacked relation, thrust rollers mounted in said cage, each of said rollers simultaneously engaging a pair of immediately adjacent transmission balls and constituting free-rolling thrust absorbing members, small hardened pins in said cage to rotatably mount said thrust rollers, means to secure one end of the force transmitting roller against noticeable movement, and resilient means coupled to the opposite end of the force transmitting roller and biasing the force transmitting roller toward said transmission balls.

2. A ball integrating transmission having a pair of stacked transmission balls coupling a roller and a disc, which comprises a ball cage adapted to contain said pair of balls in stacked relation, disc-like thrust rollers mounted in said cage on opposite sides of the pair of balls with each simultaneously engaging the pair of transmission balls and constituting free rolling thrust absorbing members, small hardened pins secured in said cage and rotatably supporting said thrust rollers, means to secure one end of the roller against appreciable movement, and resilient means coupled to the opposite end of the roller and biasing the roller toward said transmission balls.

3. A ball integrating transmission having a plurality of stacked transmission balls coupling a roller and a disc, which comprises means to secure one end of the roller against noticeable movement, support means to rotatably support the opposite end of the roller and resilient means coupled to said support means for the roller and biasing the support means to move the roller toward said transmission balls.

4. A ball integrating transmission having a plurality of stacked transmission balls coupling a roller and a disc, which comprises a relatively stationary ball bearing means secured to one end of the roller and preventing appreciable radial movement of the roller, a radially movable mounted bearing secured to the opposite end of the roller, resilient means coupled to the radially movable mounted bearing and stressed to continuously urge the roller into engagement with said transmission balls, and means mounting the transmission balls upon the disc adjacent the movable bearing.

5. A ball integrating transmission having a plurality of stacked transmission balls coupling a roller and a disc, which comprises a ball bearing secured to one end of the roller, a support including a stationary wall having an aperture to accommodate said ball bearing, a second ball bearing secured to the opposite end of the roller, a movable wall having an aperture to accommodate the second ball bearing, a shaft secured to the movable wall and projected through an opening in the support, and a coil spring encircling the shaft and secured at opposite ends to the support and the free end of the shaft, said coil spring being compressed to urge the movable wall and corresponding end of roller toward the support to load said transmission balls.

6. A ball integrating transmission having a plurality of stacked transmission balls coupling a roller and a disc with the axis of the roller and disc being coplanar, which comprises a ball bearing secured to one end of the roller, a support including a stationary wall having an aperture to accommodate said ball bearing, a second ball bearing secured to the opposite end of the roller, a movable wall having an aperture to accommodate the second ball bearing, a cage supporting said transmission balls with their centers in plane of the axis of the roller and disc, said cage being mounted for radial movement between the movable wall and the center of the disc, a shaft secured to the movable wall and slidably journaled in an opening in the support, and a resilient member connected to the shaft and stressed to urge the movable wall and corresponding end of the roller toward the support to load said transmission balls.

7. A ball integrating transmission having a plurality of stacked transmission balls coupling a roller and a disc, which comprises a base support plate, a shaft journaled in said plate and secured to the back side of the disc, a thrust bearing mounted between the disc and the plate to absorb axial forces on the disc, a ball bearing secured to one end of the roller, a stationary wall attached to the support plate and having an aperture to accommodate said ball bearing, a second ball bearing secured to the opposite end of the roller, a movable wall having an aperture to accommodate the second ball bearing, a shaft secured to the movable wall and slidably journaled in an opening in the support plate to locate the axis of the roller in a common plane with the axis of the disc, a collar secured to the end of the shaft, a cage supporting the transmission balls adjacent the movable wall, and a coil spring encircling the shaft between the plate and the collar and shaft being compressed to urge the movable wall and corresponding end of roller toward the support to load said transmission balls.

8. A ball integrating transmission having a plurality of stacked transmission balls coupling a roller and a disc, which comprises a ball cage adapted to contain said balls in stacked relation, thrust rollers mounted in said cage and having a diameter adapted to simultaneously engage pairs of immediately adjacent transmission balls and constituting free-rolling thrust absorbing members, and small hardened pins in said cage to rotatably mount said thrust rollers.

References Cited in the file of this patent
UNITED STATES PATENTS

| | | |
|---|---|---|
| 1,062,500 | Pollen et al. | May 20, 1913 |
| 2,572,523 | Schaefer | Oct. 23, 1951 |
| 2,687,043 | Umsted | Aug. 24, 1954 |
| 2,828,638 | Rullo | Apr. 1, 1958 |
| 2,881,623 | Eldridge | Apr. 14, 1959 |